United States Patent [19]

Peterson

[11] 3,964,389

[45] June 22, 1976

[54] PRINTING PLATE BY LASER TRANSFER

[75] Inventor: John O. H. Peterson, Cape Elizabeth, Maine

[73] Assignee: Scott Paper Company, Philadelphia, Pa.

[22] Filed: Jan. 17, 1974

[21] Appl. No.: 434,256

[52] U.S. Cl. .............................. 101/467; 101/401.1; 346/76 L; 427/53; 427/385

[51] Int. Cl.[2] ...................... B41C 1/06; B41C 1/10; G01D 15/14

[58] Field of Search ................. 101/401.1, 467, 471; 346/76 L; 427/53, 385

[56] References Cited

UNITED STATES PATENTS

| | | | |
|---|---|---|---|
| 2,862,815 | 12/1958 | Sugarman | 117/161 ZA |
| 2,969,732 | 1/1961 | Kendall | 101/128.3 |
| 3,207,621 | 9/1965 | Newman et al. | 117/36.1 |
| 3,448,458 | 6/1969 | Carlson et al. | 346/76 L |
| 3,532,055 | 10/1970 | Wheeler | 101/467 X |
| 3,554,125 | 1/1971 | Van Dorn | 101/467 X |
| 3,592,644 | 7/1971 | Vrancken | 117/36.1 X |
| 3,619,157 | 11/1971 | Brinckman | 101/463 X |
| 3,745,586 | 7/1973 | Braudy | 101/471 |
| 3,787,210 | 1/1974 | Roberts | 346/76 L |
| 3,793,025 | 2/1974 | Vrancken | 101/464 X |

*Primary Examiner*—Clyde I. Coughenour
*Attorney, Agent, or Firm*—John A. Weygandt; John W. Kane, Jr.

[57] ABSTRACT

Material is transferred by a laser beam from a transparent carrier film to a lithographic surface, thereby producing a planographic printing plate and a film having clear areas corresponding to the image on the plate.

1 Claim, 2 Drawing Figures

PRINTING PLATE BY LASER TRANSFER

BACKGROUND OF THE INVENTION

1. Field of the Invention

This invention relates to the recording of information on film and the simultaneous preparation of planographic printing plates.

2. Description of the Prior Art

Recently many systems for imaging printing plates with laser beams have been proposed. By and large the problems associated with manipulation of the laser beam have been overcome. There remains a need however for a rapid and efficient means for producing plates.

In addition it would be desirable to have a negative transparent master of the image produced by the laser beam. Such a negative could be used in the production of proof copies or for imaging additional printing plates.

It is therefore an object of this invention to improve the production of high quality printing plates by means of a laser beam.

Another object of the invention is to provide both a negative transparency and a planograhic printing plate by laser recording techniques in a single operaton.

SUMMARY OF THE INVENTION

Figure 1:
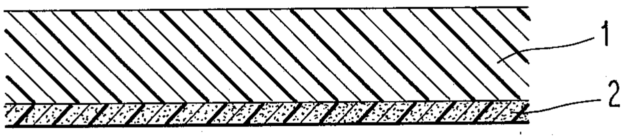
FIG. 1 is a cross-sectional view showing the construction of the article of the present invention.

In accordance with the present invention a transparent film such as polyester film is coated with a formulation comprising a material which absorbs laser energy, such as carbon black particles, a self-oxidizing binder, such as nitrocellulose, and a cross-linking agent or a cross-linking agent in combination with a cross-linkable resin a non-oxidizing polymeric material or resin. Preferred is a cross-linking agent in combination with a cross-linkable resin, the cross-linking reaction being initiated by heat. Referring now to FIG. 1 of the drawing, transparent film 1 is provided with a coating 2 of the laser responsive formulation of the present invention.

Figure 2:
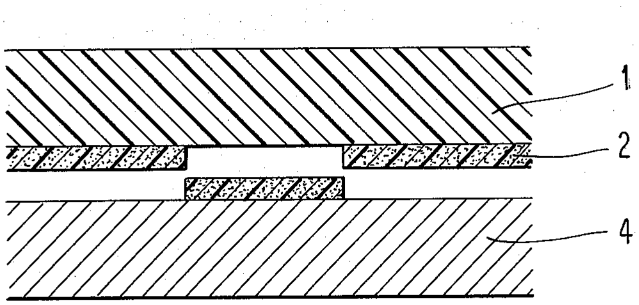
FIG. 2 is a cross-sectional view illustrating the formation of an image area on the article of the present invention.

To record on this lamination of film and coating, a beam of energy from a laser which produces wave lengths in the infrared region such as a YAG (yttrium-aluminum-garnet) laser which has an effective wave length from about 1.06 microns, or by an argon laser, which has an effective wave length in a range of from about 0.48 to about 0.52 microns, is focused by means known in the art through the transparent film to the interface between the coating and the film. The energy provided by the laser beam heats the self-oxidizing binder to initiate combustion. This combustion, or blow-off, at this point carries with it the heat absorbing particles and the resin, leaving a clear area on the film, as shown in FIG. 2.

If a conventional lithographic printing surface 4 such as a sheet of aluminum is placed adjacent to the coating 2, irradiation with the laser causes the selected transfer of the coating 2 on the film 1 to the lithographic printing surface 4. The transferred portions of the coating, being ink-receptive, become the image areas for the planographic plate. In the preferred embodiment, the thus-imaged plate is subjected to a heat treatment to cross-link the resin, thereby forming a tough, durable image on the lithographic printing surface.

The clear areas on the film correspond to the image areas on the plate. The laser-imaged film thus constitutes a negative transparent master of the image produced by the laser beam on the plate. Such a negative is useful in the production of proof copies or for imaging conventional photolithographic printing plates.

DETAILED DESCRIPTION OF THE INVENTION

Means for modulating a laser beam to record information on a substrate are well known in the art and need not be discussed here. In general they can be characterized as scanning mechanisms which cause the beam to traverse the area, delivering energy in a predetermined manner. Suitable apparatus is described in U.S. Pat. No. 3,739,088 granted June 12, 1973.

EXAMPLE 1

The following coating was applied onto a 3 mil (0.003 inch) thick Mylar polyester film:

| | Parts by Weight |
|---|---|
| Carbon | 1 |
| Nitrocellulose | 1 |
| Methyl methacrylate | 2 |

Methyl ethyl ketone in an amount sufficient to adjust total solids content to 10% by weight.

The coating was applied using a No. 6 mayer rod at a rate to provide a dry coating weight of 0.5 pounds per ream (3300 square feet).

The coated surface of the film was placed in intimate contact with the surface of a 5 mil sheet of aluminum foil. A YAG laser was directed through the transparent mylar film from its uncoated surface to record the information to be printed. As the film was selectively irradiated by the modulated beam, the coating in the area struck by the beam was transferred from the film to the adjacent aluminum surface adapted to receive the transferred image created by the laser beam. The thus imaged plate was mounted on a conventional lithographic printing press where approximately 1,000 satisfactory copies were printed before the plate showed appreciable signs of wear.

EXAMPLE 2

The following coating was applied onto a 3 mil thick Mylar polyester film:

| | Parts by Weight |
|---|---|
| Carbon | 1 |
| Nitrocellulose | 1 |
| Butvar :Monsanto's B76, a reaction product of poly (vinyl alcohol) and butyraldehyde | 0.5 |

Methyl ethyl ketone in an amount sufficient to adjust total solids content to 10% by weight.

All other conditions were the same as in Example 1.

The imaged plate was mounted on a conventional lithographic printing press where approximately 300 satisfactory copies were printed before the plate showed appreciable signs of wear.

EXAMPLE 3

The following coating was applied onto a 3 mil thick Mylar polyester film:

| | Parts by Weight |
|---|---|
| Carbon | 1.0 |
| Nitrocellulose | 0.7 |
| Alkyd resin | 2.3 |

Methyl ethyl ketone in an amount sufficient to adjust total solids content to 8% by weight.

The coating was applied using a No. 6 mayer rod at a rate to provide a dry coating weight of one pound per ream.

All other conditions were the same as in Example 1 with the exception that the coated surface of the film was placed in intimate contact with the surface of a sheet of aluminum foil which had a lithographic coating of cross-linked poly(vinyl alcohol).

The imaged plate was mounted on a conventional lithographic printing press where approximately 230 satisfactory copies were printed before the plate showed appreciable signs of wear.

EXAMPLE 4

The following coating was applied onto a 3 mil thick Mylar polyester film:

| | Parts by Weight |
|---|---|
| Carbon | 36.7 |
| Nitrocellulose | 18.3 |
| Cymel 301 ( a melamine derivative cross-linking agent sold by American Cyanamid Co.) | 44.1 |
| p-toluene sulfonic acid | 0.9 |

Methyl ethyl ketone in an amount sufficient to adjust total solids content to 10.8% by weight.

The coating was applied using a No. 6 mayer rod at a rate to provide a dry coating weight of 0.46 pounds per ream.

The coated surface of the film was placed in intimate contact with the surface of a 5 mil sheet of aluminum foil. A YAG laser was directed through the transparent mylar film from its uncoated surface to record the information to be printed. As the film was selectively irradiated by the modulted beam, the coating in the area struck by the beam was transferred from the film to the adjacent aluminum surface adapted to receive the transferred image created by the laser beam. The thus imaged plate was heated in an oven at 145°C for 30 seconds and then at 1950°C for one half second. It is believed that, during this heating step the melamine derivative cross-links with the nitrocellulose transferred to the lithograhic surface. Thereafter the plate was mounted on a conventional lithographic printing press where approximately 800 satisfactory copies were printed. Following this, the plate was examined and showed no appreciable signs of wear.

EXAMPLE 5

| | Parts by Weight |
|---|---|
| Carbon | 22.0 |
| Nitrocellulose | 11.0 |
| Araldite 485-E50 (an expoxy resin sold by Ciba-Geigy) | 44.0 |
| Cymel 301 | 22.0 |
| p-toluene sulfonic acid | 0.9 |

Methyl ethyl ketone in an amount sufficient to adjust total solids content to 15.0% by weight.

All other conditions were the same as in Example 4 with the following exceptions: the coating weight was 0.74 pounds per ream and the imaged plate was heated and cured in a Ricoh "Ricoh Fuser" at the No. 6 setting.

After 1500 copies were run, the plate showed no appreciable wear.

EXAMPLE 6

| | Parts by Weight |
|---|---|
| Carbon | 15.3 |
| Nitrocellulose | 7.65 |
| DeSoto 461-114 (a styrene-allyl alcohol copolymer sold by DeSoto Chemical Co.) | 61.2 |
| Cymel 301 | 15.3 |
| p-toluene sulfonic acid | 0.6 |

Methyl ethyl ketone in an amount sufficient to adjust total solids content to 19.8% by weight.

All other conditions were the same as in Example 4 with the following exceptions: the coating weight was 0.68 pounds per ream and the imaged plate was heated in an oven at 195°C for five minutes.

After 31,000 copies were run, the plate showed no appreciable wear.

EXAMPLE 7

| | Parts by Weight |
|---|---|
| Carbon | 15.4 |
| Nitrocellulose | 7.7 |
| Novolac resin (cresol formaldehyde) | 60.9 |
| Cymel 301 | 15.4 |
| p-toluene sulfonic acid | 0.6 |

Methyl ethyl ketone in an amount sufficient to adjust total solids content to 20% by weight.

All other conditions were the same as in Example 4 with the following exceptions: the coating weight was 0.68 pounds per ream and the imaged plate was heated in a 195°C oven for five minutes.

After 43,000 copies were printed the plate showed no appreciable signs of wear.

What is claimed is:

1. The method of making an imaged printing plate comprising the steps of:

providing a transparent substrate having thereon a coating comprising a. particles which absorb laser energy b. a self-oxidizing binder and c. a cros-linking agent or a cross-linking agent in combination with a cross-linkable resin placing said coating in intimate contact with a lithographic printing surface, selectively transferring the coating to said lithograhic printing surface by directing laser energy through the film to the surface, and cross-linking the binder or resin by heating.

* * * * *